TRISSLER & BRECHT.
Coffee Roaster.
No. 7,329.
Patented April 30, 1850.
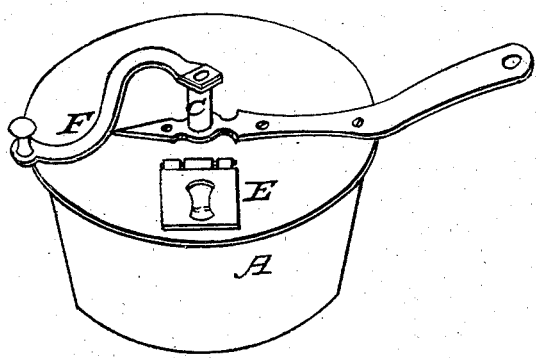
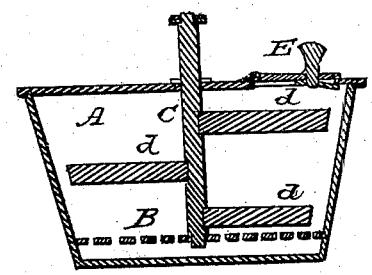

UNITED STATES PATENT OFFICE.

W. H. TRISSLER AND ELIAS BRECHT, OF FAIRVIEW, PENNSYLVANIA.

ROASTING COFFEE.

Specification of Letters Patent No. 7,329, dated April 30, 1850.

*To all whom it may concern:*

Be it known that we, W. H. TRISSLER and ELIAS BRECHT, of Fairview, in the county of Erie and State of Pennsylvania, have invented a new and Improved Coffee-Roaster; and we do hereby declare the following to be a full and exact description thereof, reference being had to the accompanying drawings, making a part of this specification, in which—

Figure 1, is a perspective view, and Fig. 2, a vertical central section of the same.

Similar letters indicate like parts in all the figures.

Our improved coffee roaster is composed of a water tight vessel A, having a perforated false bottom B, located a short distance above its true bottom, and a shaft C, in its center armed with stirring wings $d$, $d$. The top of the vessel A, is permanently secured thereto, and projects a sufficient distance to form a flanch for sustaining the roaster when it is placed in one of the holes in the top of a cooking stove.

E, is a door in the top of the roaster through which coffee is admitted thereto.

F, is a crank upon the upper end of the shaft C, by which it is rotated for the purpose of agitating the coffee during the roasting process.

Previous to placing the coffee in the vessel A, to undergo the roasting process, a small quantity of water must be poured into the space between the perforated false bottom B, and the bottom of the roaster; which water will be speedily evaporated when the roaster is exposed to the action of fire, and the vapor produced thereby will penetrate and expand the coffee grains, and thereby prepare them for the rapid and efficient action of the dry roasting heat that will disperse the vapor. By which improved process, we greatly facilitate the roasting of coffee, at the same time that we perform the operation more perfectly than it can be accomplished in any other manner.

What we claim as our invention and desire to secure by Letters Patent, is—

The application of steam or vapor to the grains of coffee, just previous to subjecting them to the action of a dry roasting heat, within an apparatus constructed and operated substantially in the manner herein set forth.

The above specification signed and witnessed this 21st day of January 1850.

W. H. TRISSLER.
ELIAS BRECHT.

Witnesses:
DANIEL L. RIELLEY,
GEORGE TRISSLER.